Feb. 12, 1924. 1,483,429
J. N. GOODALL
REAMER
Filed Jan. 4, 1923 2 Sheets-Sheet 1
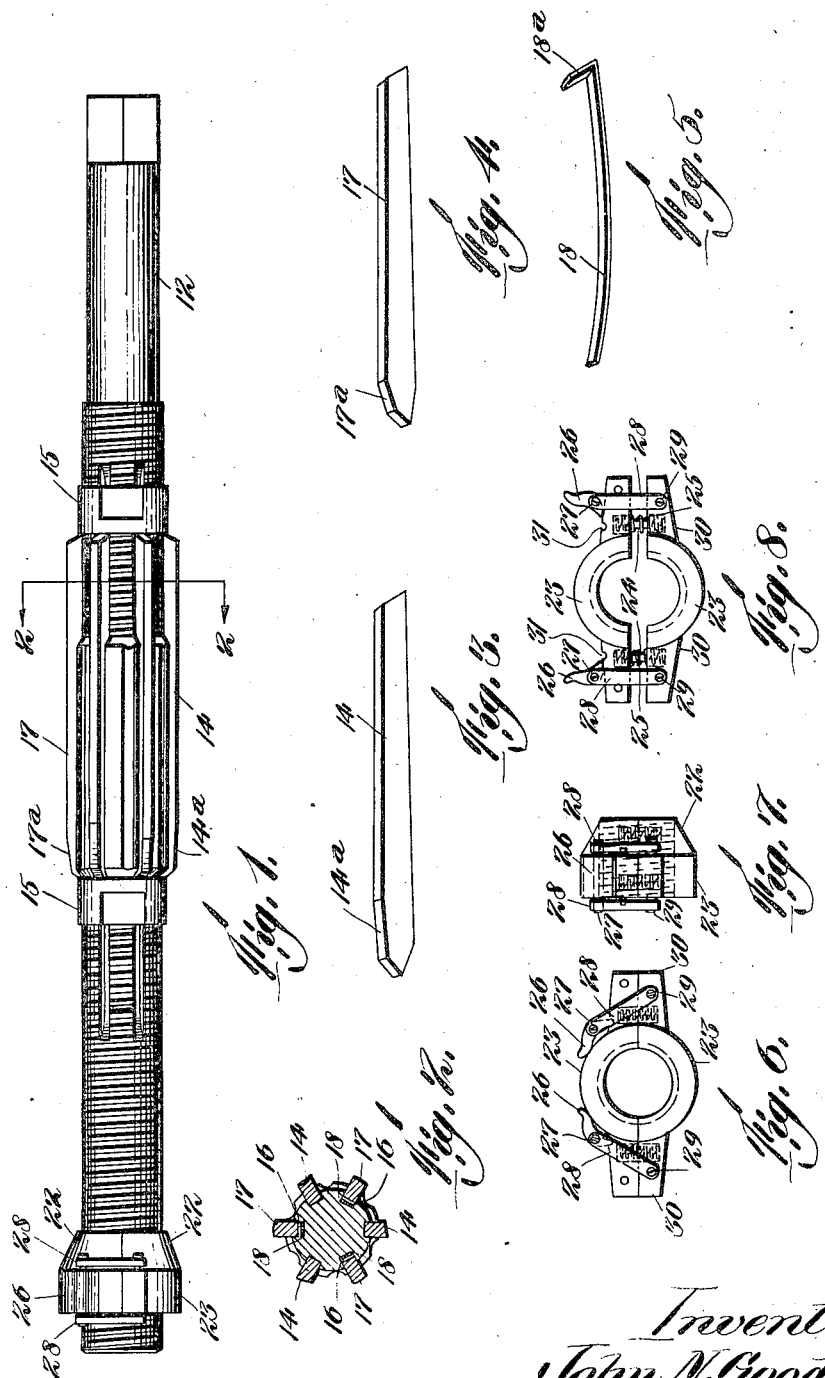

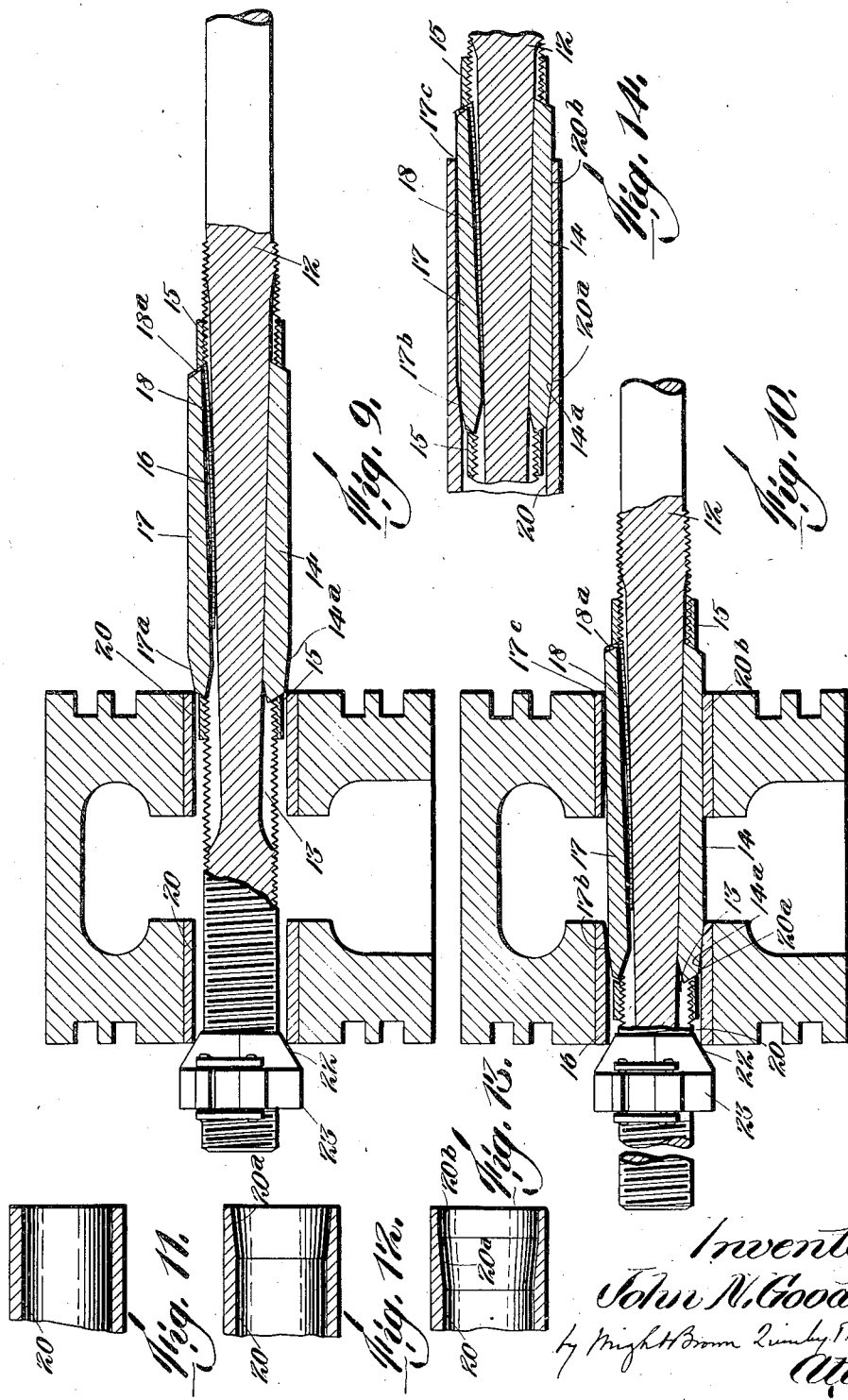

Patented Feb. 12, 1924.

1,483,429

UNITED STATES PATENT OFFICE.

JOHN N. GOODALL, OF PORTSMOUTH, NEW HAMPSHIRE.

REAMER.

Application filed January 4, 1923. Serial No. 610,597.

*To all whom it may concern:*

Be it known that I, JOHN N. GOODALL, a citizen of the United States, residing at Portsmouth, in the county of Rockingham and State of New Hampshire, have invented new and useful Improvements in Reamers, of which the following is a specification.

This invention relates particularly to reamers for truing the bore of the bushing in a piston pertaining to an internal combustion engine, although a reamer embodying the invention may be used for other work.

One object of the invention is to provide a reamer, the usual spaced apart cutting blades of which alternate with spring-pressed center guides radially movable in longitudinal slots in the reamer shank, and adapted to enter the bore as fast as the same is enlarged by the cutting blades, and to be pressed outward against the completed portion of the bore during the reaming operation, and prevent lateral movements of the cutting blades in the bore, and injury to the surface of the bore which might be caused by such lateral movements.

Another object is to provide the shank of the reamer with a centering nut adapted to be held stationary by contact with the incomplete end of the bore during the major part of the reaming operation, so that the shank and the cutting blades are fed forward by the engagement of the shank with the centering nut, and without endwise pressure by the operator on the shank until the reaming operation is nearly completed, the centering nut being then caused, by the advancing movement of the shank, to separate from the bore and turn with the shank, so that the latter part of the reaming operation is accomplished by simultaneous rotation of, and endwise pressure on the shank, without the necessity heretofore existing of removing the reamer and reversing the position to complete the reaming operation.

I accomplish the above-mentioned and other related objects by the improved construction hereinafter described and claimed.

Of the accompanying drawings forming a part of this specification,—

Figure 1 is a side elevation of a reaming cutter, embodying the invention.

Figure 2 is a section on line 2—2 of Figure 1.

Figure 3 is a perspective view of one of the cutting blades.

Figure 4 is a perspective view of one of the center guides.

Figure 5 is a perspective view of one of the springs backing the center guide.

Figure 6 is an end view, showing the centering nut closed.

Figure 7 is a side view of the same.

Figure 8 is a view similar to Figure 6, showing the centering nut open.

Figure 9 shows the reamer partly in section and partly in elevation, and shows also in section a piston to which the reamer is applied, the reamer being shown as it appears at the commencement of the reaming operation.

Figure 10 is a view similar to Figure 9, showing the reamer as it appears near the end of the reaming operation.

Figures 11, 12, 13 and 14 are fragmentary sectional views.

The same reference characters indicate the same parts in all of the figures.

The shank 12 of the reamer is externally threaded throughout the greater portion of its length, and is provided as usual, with longitudinal slots 13, the bottoms of which are inclined relative to the axis of the shank, as shown by Figures 9 and 10.

The usual cutting blades 14 are movably inserted in said slots, and are provided with beveled end faces, engaged with the beveled ends of confining nuts 15, screwed upon the shank.

The construction thus far described, which is not new with me, provides for radial adjustment of the cutting blades in a well known manner.

The cutting portions of the blades are the inclined portions 14ª, these being adapted to enter a bore 20 which has not been reamed (Figure 11), and to progressively enlarge the bore and form therein a tapered portion 20ª (Figures 12 and 13), which progresses from end to end of the bore as the operation proceeds, so that the diameter of the bore is gradually enlarged, the portion 20ª being first at one end of the bore, and then progressing toward the other end, as may be seen by comparing Figure 13 with Figure 12.

For a better understanding of the function of the center guides 17, hereinafter described I have shown in Figure 14 a bore 20, which is continuous, instead of being interrupted as shown by Figures 9 and 10.

The shank is provided with longitudinal slots 16, alternating with the slots 13. In the slots 16 are radially movable center guides 17, having beveled ends, adapted to be engaged by the beveled ends of the confining nuts 15, as shown by Figures 9 and 10. Between the center guides 17 and the bottoms of the slots 16 are interposed curved springs 18, preferably having hooked ends 18$^a$, bearing on the outer ends of the guides 17, the springs contacting with the guides at their end portions, and with the shank at an intermediate portion. The form of the guides 17 is such that their outer edges are normally held by the springs at the same distance from the axis of the shank as the outer edges of the cutting blades 14, before the operation commences, as shown by Figure 9.

Each guide 17 is provided with an inclined face 17$^a$, arranged as shown by Figure 9, to enter the bore portion 20$^a$, while the latter is being formed, and contact with said portion at the point 17$^b$. This contact centers the reamer at the commencement of the operation, and inclines the guide 17. When the operation has sufficiently progressed to form an enlarged and completed bore portion 20$^b$, the guide contacts with the bore at the points 17$^b$ and 17$^c$, and is elsewhere out of contact with the bore, the point 17$^b$ being within the tapered bore portion 20$^a$, and the point 17$^c$ being at the outer end of the bore portion 20$^b$. The pressure of the guides at the points 17$^c$ continues the centering of the reamer until the operation is completed.

As the reamer advances, the tapered bore portion 20$^a$ forces the forward ends of the center guides inward against the outward pressure of the springs 18, and presses said ends slightly inward from the forward clamping-nut 15. At the same time the pressure of the rear ends of the center guides against the rear clamping nut by the springs, forces the center guides slightly forward, and increases the radial distance of the outer edges of the guides from the axis of the reamer at the rear ends of the guides, so that the guides are caused to bear heavily on the bore portion 20$^b$, at the point 17$^c$; and on the bore portion 20$^a$ at the point 17$^b$. Between these points the guides are out of contact with the bore. These relative positions are maintained substantially uniform during the entire operation, and are changed but slightly as the rear end portions of the center guides are forced inward by the bore portion 20$^b$, as the operation progresses.

The outer edges of the guides 17 are rounded, as indicated by Figure 2, so that each guide has a limited bearing on the bore, and is prevented from indenting or marring the same.

It will be seen that the guides 17 alternating with the cutting blades, prevent any possibility of lateral movements of the cutting blades in the bore, and injury to the surface of the bore, which might be caused by such lateral movements.

I provide a centering nut engaged with the threaded portion of the shank 12, and having a frusto-conical abutment face 22, adapted to be seated on the end of the bore opposite the end entered by the cutting blades at the commencement of the operation. Said nut is confined against rotation by the frictional bearing of its face 22 on the bore end, while the major portion of the bore is being reamed, so that the shank and the cutting blades are fed endwise by the rotation of the shank in the nut, until the inner confining nut 15 contacts with the centering nut, the major portion of the bore being then completed.

The conical face 22 enters the outer end of the bore, or the end that has not been reamed, as shown by Figures 9 and 10, and cooperates with that end in centering the reamer during the major portion of the operation.

Contact of the inner confining nut 15 with the centering nut separates the abutment face 22 from the bore end, so that subsequent rotation of the reamer causes the centering nut to turn with the reamer shank and move away from the bore during the completion of the reaming operation.

It will be seen that during the major portion of the reaming operation, no endwise pressure on the shank by the operator is required, the operator simply turning the shank, which is fed forward as above described.

It will also be seen that when the reaming operation is nearly completed, the above described action of the centering nut is discontinued, the nut moving away from the bore, so that during the completion of the bore, the operator has to exert endwise pressure on the shank as usual.

The reamer is steadied during the latter part of the reaming operation by the bearing of the center guides on the bore.

I prefer to make the centering nut in two sections 23, adapted to be separated as indicated by Figure 8, and guided in their movements toward and from each other by steady pins, 24 springs 25 being provided to normally separate the sections. To close the sections I may provide any suitable means, said means in this instance including levers 26, pivoted at 27 to swinging links 28. These links are pivoted at 29 to arms 30, on one of the sections 23. The corresponding arms on the other section 23 are provided with notches 31, adapted to engage the levers 26, as indicated by Figure 6. Provision is thus made for quickly opening and closing the centering nut.

The operator first applies the reamer to the work in the position shown by Figure 9, the centering-nut being adjusted so that its face 22 is pressed firmly against one end of the bore to be reamed, and the acting portions 14$^a$ of the cutting blades are pressed firmly against the opposite end of the bore. The forward ends of the inclined faces 17$^a$ are in position to enter the bore when the reamer is advanced. The operator now rotates the reamer, and the acting portions of the cutting blades commence to ream the bore at one end thereof. The centering-nut is prevented from rotating by its frictional engagement with the opposite end of the bore, so that the rotation of the shank causes it to move endwise in the nut. As the reaming action progresses the inclined faces 17$^a$ enter the bore portion 20$^a$, and the forward ends of the center guides 17 are pressed inward. When the reaming operation has progressed sufficiently, the outer edges of the center guides bear at 17$^c$ on the completed bore portion 20$^b$, the center guides being forced inward by the bore from their normal positions, and held by the springs in close contact with the bore, until the reaming operation is completed.

Owing to the fact that the centering-nut is released from its frictional engagement with the work before the reaming operation is completed, the completion of said operation is effected by a continuation of the rotation of the shank, accompanied by endwise pressure thereon by the operator, so that the entire operation is performed by a movement of the cutting blades in one direction, it being unnecessary to remove the reamer when it reaches the position shown by Figure 10, and reverse its position to complete the reaming operation.

It will now be seen that the centering guides act at one end of the bore, and the centering nut at the opposite end, the guides centering the reamer in line with the nut.

In perpendicular reaming the centering guides, by their pressure against the bore, support the weight of the reamer, and prevent the cutting portions of the cutting blades from being pressed by that weight too forcibly against the bore portion on which they are acting.

In horizontal reaming the center guides maintain the blades absolutely true to the axis of the bore, and prevent the under side of the reamer from pressing too heavily on the under side of the bore. This is important when the reamer is particularly large and heavy.

I claim:

1. A reamer comprising a screw-threaded shank, cutting blades inserted in longitudinal slots in the shank, and confined against endwise movement by adjustable stop nuts engaged with the shank, center guides alternating with the cutting blades, radially movable in corresponding longitudinal slots in the shank, and confined against endwise movement by said stop nuts, and springs normally pressing the center guides outward against the stop nuts, and permitting radial inward yielding movement of said guides, the guides being normally pressed radially outward by the springs, and adapted to be displaced inward from their normal positions and inclined by contact with the bore reamed by the cutting blades, so that the guides are pressed by the springs against spaced apart points in said bore, to prevent injury to the bore by lateral movement of the cutting blades during the reaming operation.

2. A reamer substantially as specified by claim 1, the outer edges of said center guides being provided with inclined faces at the forward end portions of the guides, so arranged that the forward ends are adapted, at the commencement of a reaming operation, to enter the bore with the cutting blades, said faces cooperating with the bore in forcing the guides inward as the reaming operation progresses.

In testimony whereof I have affixed my signature.

JOHN N. GOODALL.